US008020279B2

United States Patent
Horsham

(10) Patent No.: US 8,020,279 B2
(45) Date of Patent: Sep. 20, 2011

(54) METHODS AND APPARATUS FOR FORMING MESH AND LINK ELEMENTS

(75) Inventor: Kayne Bruce Horsham, Vogeltown (NZ)

(73) Assignee: Kaynemaile Limited, Lower Hutt (NZ)

( * ) Notice: Subject to any disclaimer, the term of this patent is extended or adjusted under 35 U.S.C. 154(b) by 1185 days.

(21) Appl. No.: 11/723,741

(22) Filed: Mar. 21, 2007

(65) Prior Publication Data
US 2007/0170615 A1    Jul. 26, 2007

Related U.S. Application Data

(63) Continuation-in-part of application No. 11/508,329, filed on Aug. 23, 2006, which is a continuation of application No. PCT/NZ2004/000104, filed on May 27, 2004, and a continuation-in-part of application No. PCT/NZ2004/000033, filed on Feb. 23, 2004.

(30) Foreign Application Priority Data

Mar. 12, 2003    (NZ) ........................................ 523971

(51) Int. Cl.
B21B 1/46 (2006.01)
B28B 3/06 (2006.01)
(52) U.S. Cl. .................... 29/527.1; 264/297.1
(58) Field of Classification Search ............ 29/527.1, 29/527.2, 527.3, 527.4, 527.5, 428, 458; 264/239, 297.8
See application file for complete search history.

(56) References Cited

U.S. PATENT DOCUMENTS

| 948,615 | A | 2/1910 | Pratt |
| 1,028,904 | A | 6/1912 | Pratt |
| 3,284,806 | A | 11/1966 | Prasser |
| 4,279,122 | A | 7/1981 | Rogers |
| 4,356,569 | A | 11/1982 | Sullivan |
| 4,471,495 | A | 9/1984 | Kruse et al. |
| 4,564,539 | A | 1/1986 | Tsuji |
| 4,599,751 | A | 7/1986 | Bouwhuis |
| 5,511,241 | A | 4/1996 | Ziegler |
| 5,808,852 | A | 9/1998 | Iannotti |
| 2007/0042210 | A1 | 2/2007 | Horsham |

FOREIGN PATENT DOCUMENTS

| DE | 25 24 553 | 7/1976 |
| EP | 0 469 976 | 2/1992 |
| EP | 0 679 457 | 11/1995 |
| GB | 1 507 372 | 4/1978 |
| RU | 2 051 000 C1 | 12/1995 |
| WO | WO 95/07033 | 3/1995 |
| WO | WO 02/21952 A1 | 3/2002 |

OTHER PUBLICATIONS

International Search Report of PCT/NZ2004/000104, mailed Sep. 2, 2004.
International Search Report of PCT/NZ2004/000033, mailed Apr. 8, 2004. West Pac Industrial, The Zip Tie People, Retrieved from the Internet Mar. 29, 2004, Document Archived May 6, 2001, URL: http://web.archive.org/web/20010506042653/http://www.socalmall.com/westpac/uses.htm.
Derwent Abstract Accession No. 96-400515/40, RU 2051000 C1, Dec. 27, 1995.

*Primary Examiner* — John C Hong
(74) *Attorney, Agent, or Firm* — Nixon & Vanderhye P.C.

(57) ABSTRACT

A method of adding a new link element to three or more formed link elements including the steps of: providing three or more formed link elements; and adding a new link element to the formed link elements by moulding a single link element through at least three of the formed link elements.

29 Claims, 15 Drawing Sheets

METHODS AND APPARATUS FOR FORMING MESH AND LINK ELEMENTS

CROSS-REFERENCES TO RELATED APPLICATIONS

This is a continuation-in-part of U.S. application Ser. No. 11/508,329, filed Aug. 23, 2006, pending, which is a continuation of International Application No. PCT/NZ04/00104, filed May 27, 2004, and which is a continuation-in-part of International Application No. PCT/NZ04/00033, filed Feb. 23, 2004, and which claims the benefit of New Zealand Application No. 523971, filed Mar. 12, 2003, each incorporated herein by reference in its entirety.

BACKGROUND OF THE INVENTION

Field of The Invention

The present invention relates to methods and apparatus for moulding a single link element. In particular, the present invention relates to a method of adding a new link element to three or more formed link elements, a method of adding a new link element to a mesh and apparatus for adding a link element to a component having a plurality of linkage points.

Previously known systems for producing chain mail provide an automated means of creating and forming interlinked chain mail. These automated machines can manufacture chain mail at high volume. One such example is shown in Horsham, wherein it is shown how to produce a mesh of interlinked link elements.

It is also desirable to replace a single damaged or missing link within the formed mesh or to add a single link to existing link elements.

One problem associated with adding a link element to an existing mesh is the large surface area taken up by the mesh and the need to provide the mesh to the relevant mould sections of the moulding apparatus. Apparatus previously used to mould mesh is large and bulky in order to accommodate a large number of pre-formed links so that mesh can be produced quickly. The pre-formed links are supplied in a form detached from the mesh, and are then linked to the mesh by the moulding of additional link elements. However, links already attached to the mesh cannot be accommodated by the mould sections of the apparatus due to their attachment to the rest of the mesh.

It is known to form chains wherein links are moulded through two adjacent pre-formed links to form the chain. This chain forming apparatus has a disadvantage in that a pre-moulded chain cannot easily be fed into the apparatus in order to replace a link within the chain. Further, known examples of apparatus for moulding links are particularly complex as they are specifically designed to mould a plurality of links at the same time.

Existing methods and apparatus for forming mesh by moulding interlinking link elements produce a large number of identical link elements.

The present invention aims to overcome, or at least alleviate, some or all of the afore-mentioned problems.

BRIEF SUMMARY OF THE INVENTION

In one aspect, the present invention provides a method of adding a new link element to three or more formed link elements including the steps of: providing three or more formed link elements; and adding a new link element to the formed link elements by moulding a single link element through at least three of the formed link elements.

In a further aspect, the present invention provides a method of adding a new link element to a mesh including the steps of: providing a plurality of formed link elements forming a mesh; and adding a new link element to the mesh by moulding a single link element through at least one of the formed link elements.

In yet a further aspect, the present invention provides apparatus for adding a link element to a component having a plurality of linkage points, the apparatus comprising a mould formed as a plurality of sections, at least two of which move relative to each other and close together to define a moulding cavity to mould a single link element and separate to release the moulded link element, the mould comprising: at least one section adapted to accommodate at least two linkage points of the component; and a moulding cavity dimensioned and arranged when the mould sections are closed to mould the link element as a continuous loop that is interconnected through the at least two linkage points.

According to particular embodiments of the present invention methods and apparatus are provided that enable a new link element to be added to or through existing link elements, mesh or a component. This enables easy inclusion of new link elements, as well as providing further uses for the mesh by providing link elements of a different form to the previously formed link elements. Further, components may have new link elements attached to provide further uses for the component. The apparatus is particularly adapted for use in repairing or adding additional links to existing link elements or mesh such that the apparatus can be positioned anywhere within the existing product to provide the new link element in the required orientation.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

Figure 1:
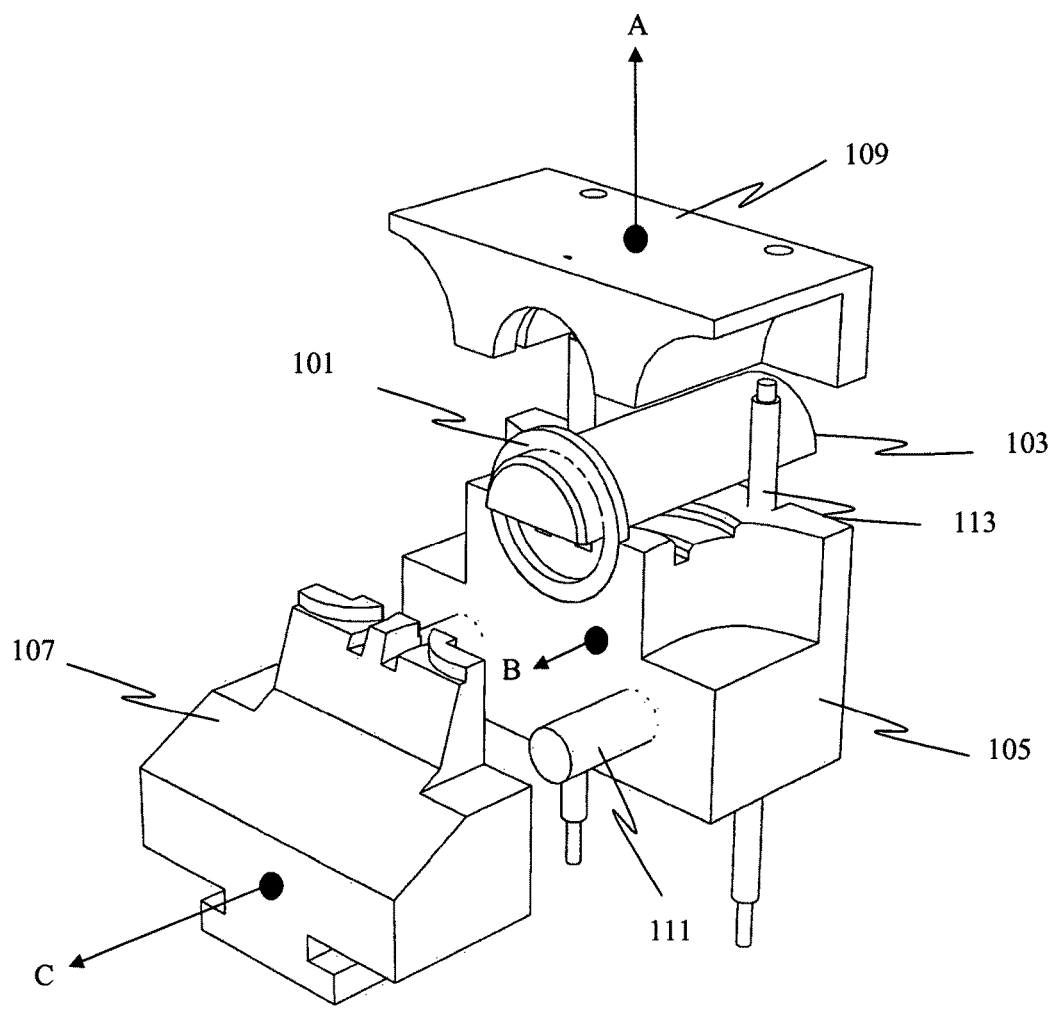
FIG. 1 shows an exploded view of moulding apparatus according to an embodiment of the present invention.

In this first embodiment of the present invention, a moulding apparatus is provided that has a moulding cavity that is arranged to mould a single link element as a continuous loop through other previously formed link elements. The moulding apparatus can be utilised to add a new link element to three or more formed link elements, or to add a new link element to at least one formed link element of a mesh. FIG. 1 shows an exploded view of a moulding apparatus according to this first embodiment. The moulding apparatus is arranged to mould a single link element 101, and includes a mould insert 103, a lower rear block 105, a lower front block 107 and an upper block 109.

Figure 2:
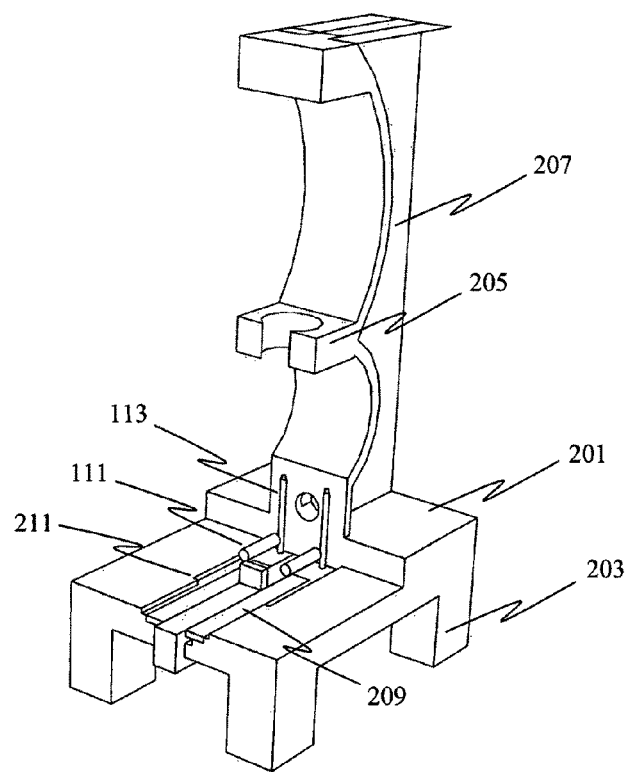
FIG. 2 shows a mounting platform for use with the moulding apparatus as shown in FIG. 1 according to an embodiment of the present invention.

FIG. 2 shows a mounting platform for use with the moulding apparatus as described above. The mounting platform includes a lower support 201 with four integrally moulded legs 203 protruding from each corner, an injector module support 205 integrally moulded to a vertical support 207, wherein the vertical support 207 is integrally moulded to the lower support 201. The mounting platform may be formed from any suitable material, such as, for example, plastics or metal, e.g. steel or aluminium. A cavity is provided on the top surface of the lower support 201, which accommodates two sliding plates 209 that enable the lower front block 107 to moveably slide along alignment shafts 111, as explained in more detail below. Lifting and guiding pins 113 are provided that enable the upper block 109 to be moved, as explained in more detail below. A stop 211 is formed in the cavity of the lower support 201, which is arranged to limit the movement of the lower front block 107 along the sliding plates 209.

It will be understood that other methods of mounting the moulding apparatus may be provided. For example, the mounting frame may be assembled from multiple parts. Further, the lower mould parts of the moulding apparatus may be guided by table guides or T-shaped slots on a table top. Alternatively, the upper mould parts of the apparatus may be attached to the injector, which is supported from a mounting on the ceiling or an extended arm. This provides further room around the moulding apparatus for work space and to accommodate large sheets of mesh.

Figure 3:
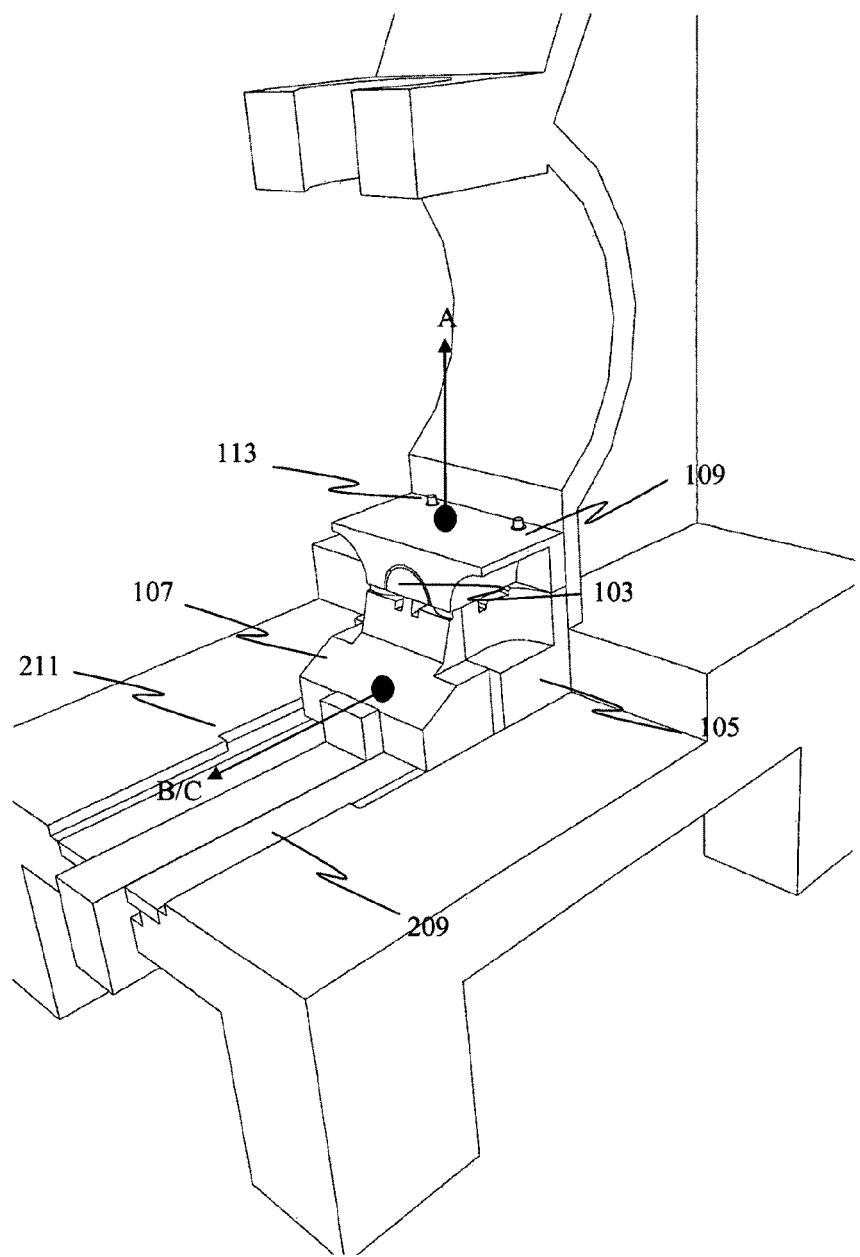
FIG. 3 shows the moulding apparatus mounted on the mounting platform according to an embodiment of the present invention.

FIG. 3 shows the moulding apparatus mounted on the mounting platform.

The different components of the moulding apparatus will now be described in more detail.

Figure 4A:
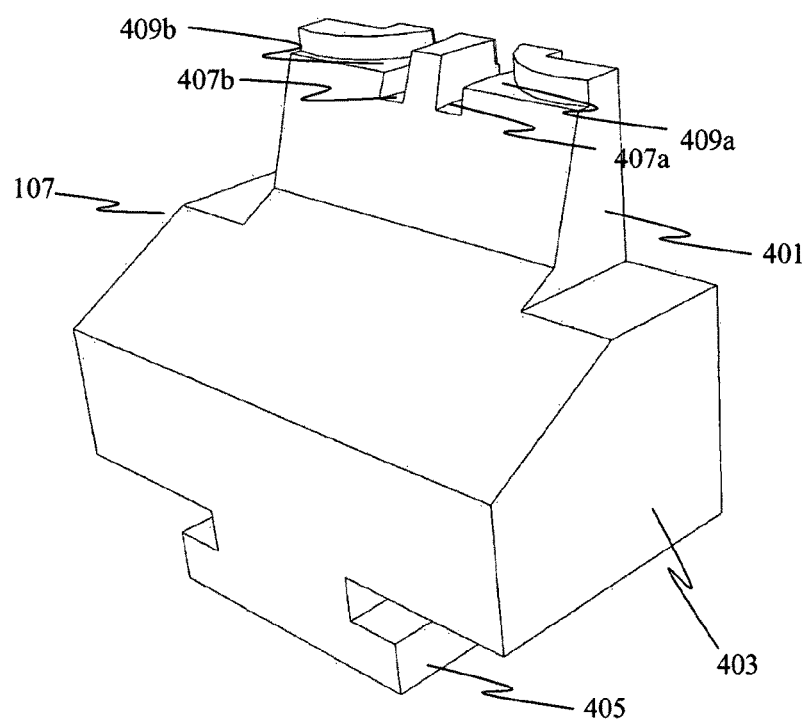
FIG. 4A shows a first view of a lower front block according to an embodiment of the present invention.

FIG. 4A shows a front perspective view of the lower front block 107. The lower front block 107 includes an upper portion 401, a lower portion 403 and a T-shaped runner 405. In this embodiment, four apertures are provided on the upper surface of the upper portion 401. It will be understood that fewer or more apertures may also be provided. Each aperture is used to accommodate a portion of a link element that has previously been formed. It will be understood that, alternatively, a single cavity could be used to accommodate multiple previously formed link elements.

On a first half of the upper portion 401, a first link accommodating aperture 407a is provided which is at least twice as deep as the thickness of a previously formed link element which is to be accommodated. The first link aperture 407a mirrors the shape of at least a portion of the previously formed link element. Also formed on the first half of the upper portion 401 is a second link accommodating aperture 409a, which is at least as deep as the thickness of a previously formed link element that is to be accommodated. The second link aperture 409a is shaped to accommodate at least a portion of a previously formed link element. It can be seen in FIG. 4A that a portion of the first link aperture 407a and second link aperture 409a coincide at the rear surface of the upper portion 401.

On a corresponding second half of the upper portion 401, a third link accommodating aperture 407b is provided which is at least twice as deep as the thickness of a previously formed link element that is to be accommodated, and is formed as a mirror image of the first link aperture 407a. That is the third link aperture 407a also mirrors the shape of at least a portion of the previously formed link element. Also formed on the second half of the upper portion 401 is a fourth link accommodating aperture 409b, which is at least as deep as the thickness of a previously formed link element that is to be accommodated, and is formed as a mirror image of the second link aperture 409a. The fourth link aperture 409b is also shaped to accommodate at least a portion of a previously formed link element. It can be seen in FIG. 4A that a portion of the third link aperture 407b and fourth link aperture 409b coincide at the rear surface of the upper portion 401.

Figure 4B:
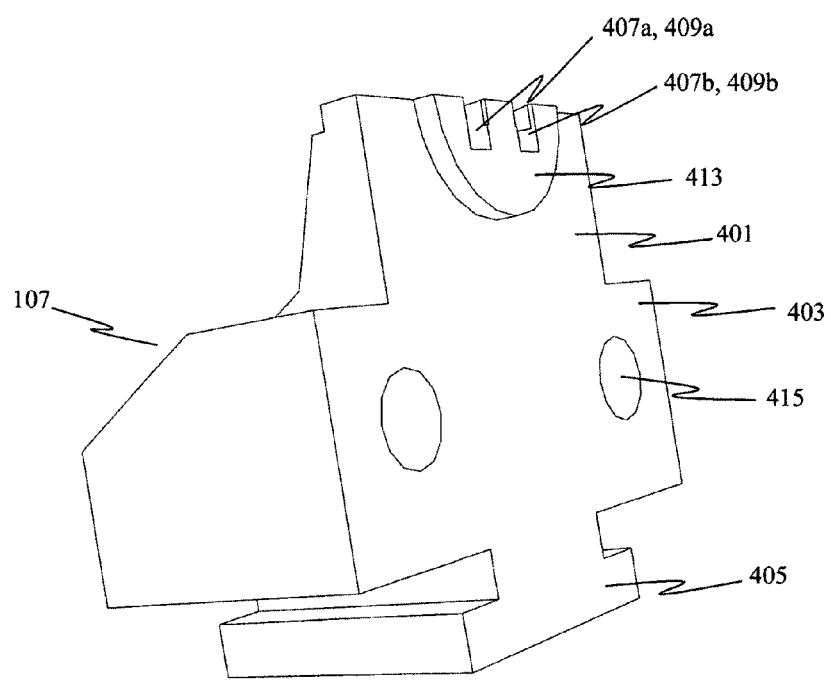
FIG. 4B shows a second view of a lower front block according to an embodiment of the present invention.

FIG. 4B shows a rear perspective view of the lower front block 107. Two tubular alignment apertures 415 are formed within the lower portion 403 of the lower front block 107. A semi-circular moulded link protrusion 413 is formed on a back face of the upper portion 401 of the lower front block. This protrusion 413 is formed to partially define a moulding cavity in which the moulded link element is created when the lower front block 107, lower rear block 105, upper block 109 and mould insert 103 are all placed in their relative positions for moulding the link element 101.

Figure 5:
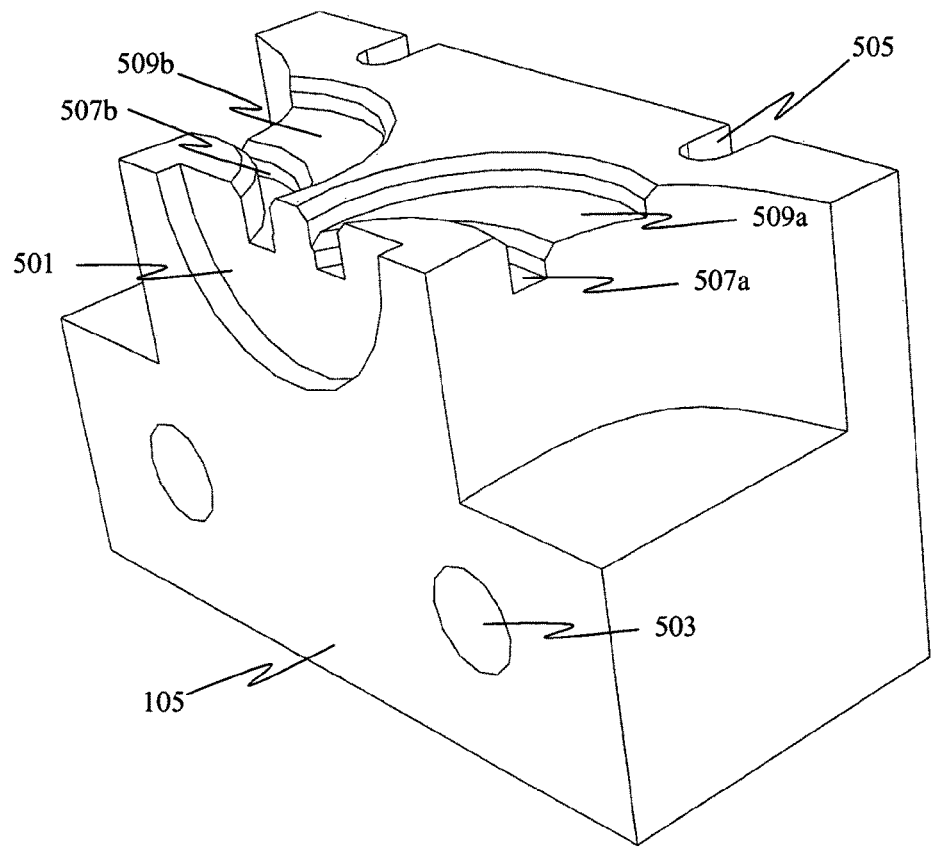
FIG. 5 shows a lower rear block according to an embodiment of the present invention.

FIG. 5 shows a front perspective view of a lower rear block 105. A semi-circular moulded link aperture 501 is formed in a front face of the lower rear block 105. The aperture 501 is located on the lower rear block 105 such that it corresponds with the protrusion 413 formed on the lower front block 107 when the two blocks are placed in position for moulding a link element. The outside circumference of the moulded link aperture 501 is greater than the circumference of the moulded link protrusion 413 such that the space provided around the circumference of the protrusion 413 when the front face of the lower rear block 105 and the rear face of the lower front block 107 are pressed together forms a first portion of the annular cavity for forming the link element 101.

Formed within the front face of the lower rear block 105 are two tubular apertures 503 for receiving the alignment shafts 111.

On the upper surface of the lower rear block 105 four link accommodating apertures (507a, 507b, 509a, 509b) are provided. It will be understood that, in the alternative, fewer or more apertures may be provided. Any aperture can be used to accommodate a portion of a link element that has previously been formed.

Provided on a first half of the upper surface of the lower rear block 105 is a first link aperture 507a, which is at least twice as deep as the thickness of a previously formed link element that is to be accommodated. The first link aperture 507a mirrors the shape of at least a portion of the previously formed link element. Also formed on the first half of the upper surface of the lower rear block 105 is a second link aperture 509a, which is at least as deep as the thickness of a previously formed link element that is to be accommodated. The second link aperture 509a is shaped to accommodate at least a portion of a previously formed link element. It can be seen in FIG. 5 that a portion of the first link aperture 507a and second link aperture 509a coincide at the front face of the lower rear block 105.

On a corresponding second half of the upper surface of the lower rear block 105, a third link aperture 507b is provided which is at least twice as deep as the thickness of a previously formed link element that is to be accommodated, and is formed as a mirror image of the first link aperture 507a. That is the third link aperture 507a also mirrors the shape of at least a portion of the previously formed link element. Also formed on the second half of the upper surface of the lower rear block 105 is a fourth link aperture 509b, which is at least as deep as the thickness of a previously formed link element that is to be accommodated, and is formed as a mirror image of the second link aperture 509a. The fourth link aperture 509b is also shaped to accommodate at least a portion of a previously formed link element. It can be seen in FIG. 5 that a portion of the third link aperture 507b and fourth link aperture 509b coincide at the front face of the lower rear block 105.

The four apertures (507a, 507b, 509a, 509b) formed on the lower rear block 105 correspond with the four apertures (407a, 407b, 409a, 409b) formed on the lower front block 107. The combination of the first link aperture 507a on the lower rear block 105 with the first link aperture 407a on the lower front block 107 provides a cavity for supporting a previously formed first link element when the lower rear block 105 and lower front block 107 are placed together in order to mould the link element 101. Likewise, second link apertures 409a and 509a provide a cavity for a second previously formed link element, third link apertures 407b and 507b provide a cavity for a third previously formed link element and fourth link apertures 409b and 509b provide a cavity for a fourth previously formed link element.

Longitudinal lifting pin apertures 505 are formed in the rear face of the lower rear block 105 to accommodate the lifting pins 113 such that space is provided to allow them to move when the lower rear block 105 is in position for moulding.

Figure 6A:
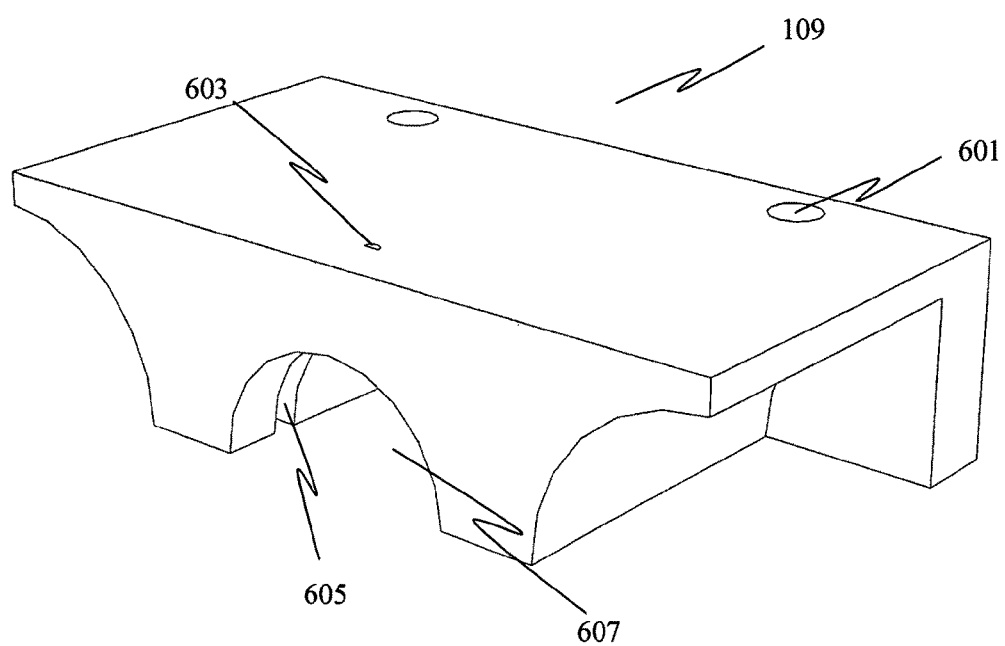
FIG. 6A shows a first view of an upper block according to an embodiment of the present invention.
Figure 6B:
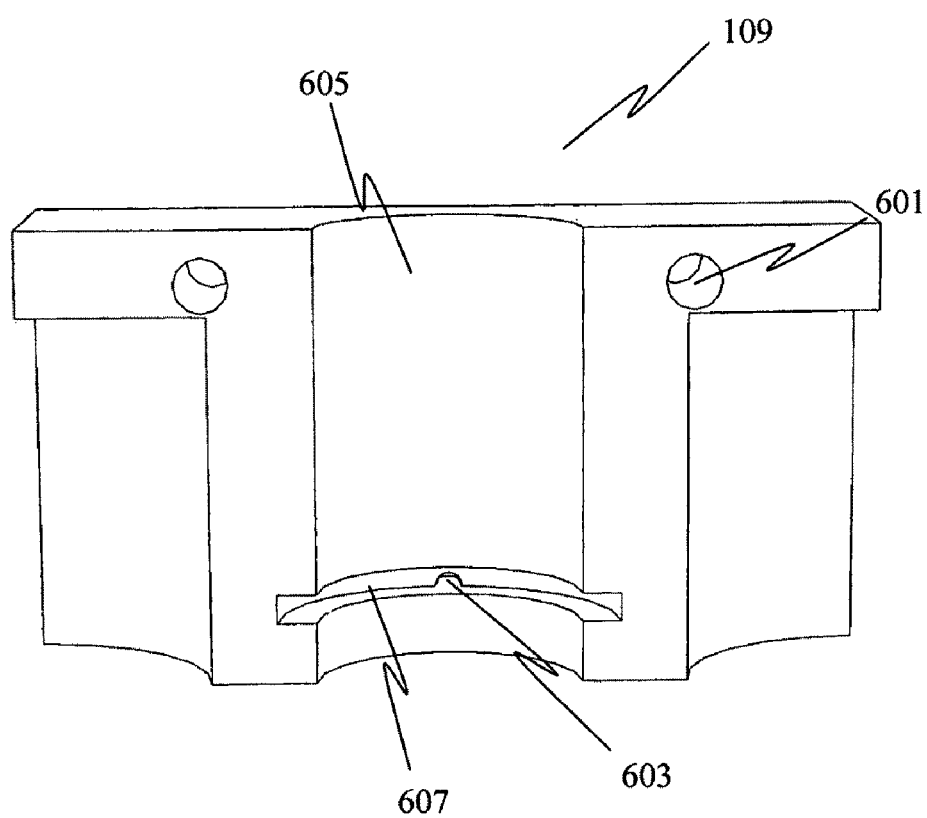
FIG. 6B shows a second view of an upper block according to an embodiment of the present invention.

FIG. 6A shows a front perspective view of the upper block 109 and FIG. 6B shows a rear perspective view. Two lifting pin shafts 601 are provided that pass through a rear section of the upper block from the top surface to the bottom surface. They are dimensioned such that when the lifting pins 113 are driven vertically through the shafts 601, the upper block 109 moves in a vertical direction. That is, one portion of the shaft 601 is of a different circumference to the rest of the shaft in order that each lifting pin 113 comes into contact with, and drives, the upper block 109 in the direction the lifting pins are being driven.

An injection mould aperture 603 is formed on a front section of the upper block 109. The aperture 603 is formed from the top surface through to an exit point that coincides with a second moulded link aperture 605. The second moulded link aperture 605 forms a second portion of the annular cavity for forming the link element 101. This second portion is located within a semi-circular aperture 607, which is arranged to receive the mould insert 103.

The semi-circular aperture 607 forms a cavity to receive the mould insert 103 when the upper block 109 is placed on top of the lower front and rear blocks (107, 105).

When the mould insert 103 is placed within the semi-circular aperture 607 and the lower front block 107 is in position for moulding, an annular cavity is formed from the first and second portions of the annular cavity. It is within this cavity that a complete moulded link element 101 is produced.

Figure 7:
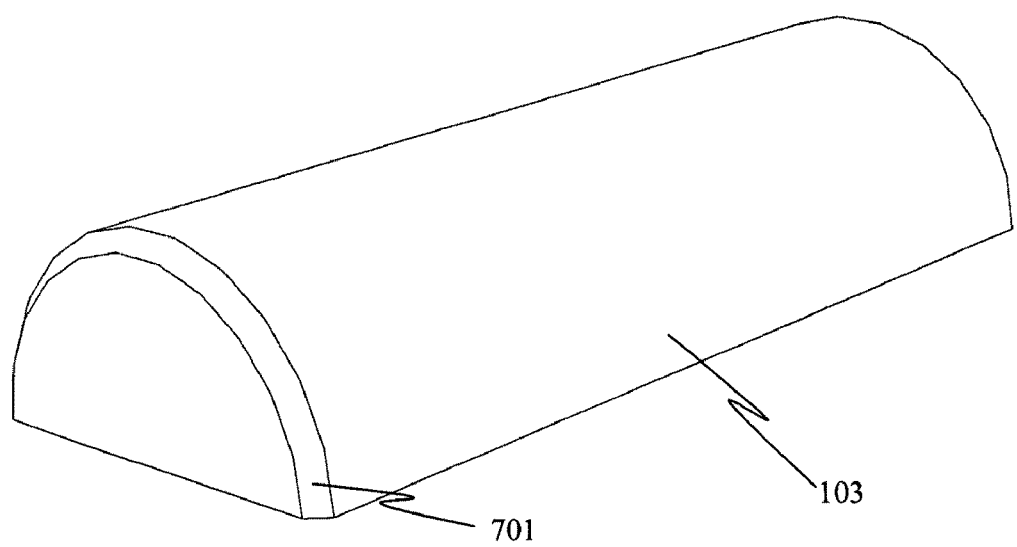
FIG. 7 shows a mould insert according to an embodiment of the present invention.

FIG. 7 shows a front perspective view of the mould insert 103. The mould insert is formed as a solid semi spherical portion. On one edge of the end portion a chamfer is formed to aid free movement of the mould insert 103 through the semi-circular aperture 607, as well as improving the movement of the mould insert when the link element 101 has been formed.

The relative movements of the different parts of the moulding apparatus will now be described with reference to FIGS. 1 and 3.

The upper block 109 is arranged above the lower rear block 105 such that it can move away from the lower rear block, as shown by arrow A in FIG. 1. The upper block is moved by lifting pins 113, which are driven to lift the upper block 109 away from the lower rear block 105. The lifting pins 113 may be moved by the operation of a manual lever connected to the pins, or may be moved by any other suitable actuator device, such as, for example, hydraulics, springs etc.

The lower rear block 105 and lower front block 107 are both moveable away from the mould insert 103, as indicated by arrow B. In this embodiment, the mould insert is in a fixed position by being fixed to the back wall of the mounting platform.

As an alternative embodiment, the mould insert may be moved automatically or manually. The movement, whether automatic or manual, disengages the moulded link element 101 from the mould insert 103. Further, it will be understood that the mould insert may be provided with positioning or gripping elements positioned on the underside of the insert in order to help move or advance the link element into or out of position during the movement of the insert.

As a further alternative embodiment, the lower front block may be modified such that it moves in an opposite direction to arrow A in FIG. 1 (i.e. the movement of the upper block). It will be understood that modifications would be required for this movement to occur, such as the removal of the alignment shafts 111, and a modification of the mating faces of the lower front and lower rear blocks such that the moulded link element is able to be released from the moulded insert upon retraction when the lower front block moves away from the lower rear block.

Referring back to the embodiment shown in FIG. 1, the lower front block 107 then moves away from the lower rear block 105, as indicated by arrow C, to allow the moulded link element 101 to be disengaged from the lower rear block 105. In this embodiment, the lower front block 107 is arranged to manually slide along the sliding plates 209 using the T-shaped runner 405. The lower rear block 105 moves by being attached to the lower front block 107 on shoulder screws, which allow both blocks to move together until hitting the stop 211. At this point, the link elements in the accommodating apertures are disengaged, thus allowing the lower front block 107 to continue to move forward. It will be understood that the lower front block 107 and lower rear block 105 may be moved by any other suitable means, whether manually or by the use of a powered driving mechanism.

The process of moulding a new link element to formed link elements will now be described with reference to the above described apparatus.

Using the above-described apparatus, a new link element may be added to three or more pre-formed link elements. The pre-formed link elements are not required to be part of a mesh that is already formed, but are separate pre-formed link elements. The pre-formed link elements are arranged in the apertures of the mould so that two are arranged in the first and second apertures (407a, 507a, 409a, 509a) and the other is arranged in one of the third or fourth apertures (407b, 507b, 409b, 509b). Alternative arrangements are also possible using different combinations of apertures.

Further, the above-described apparatus may be used to add a new link element to at least one formed link element of a mesh. That is, the pre-formed link element which is part of the mesh is placed within any one of the first, second, third and fourth apertures (407a, 507a, 409a, 509a, 407b, 507b, 409b, 509b). The moulds are closed together and the new link is moulded.

The process of moulding a new link element to a mesh will now be described.

When moulding a link element to a mesh, at least one of the formed link elements forming the mesh is placed in to one of the first, second, third or fourth apertures (407a, 507a, 409a, 509a, 407b, 507b, 409b, 509b). It will be understood that the apparatus described above can accommodate up to four pre-formed link elements in the mesh. However, it will be understood that with modifications to the apertures, further pre-formed link elements may also be accommodated.

The components of the mould are brought together as shown in FIG. 3, such that an annular cavity is formed. The annular cavity passes through the pre-formed link element forming the mesh. The components of the mould are fixed in position by any suitable means that provides sufficient force to restrict the components from moving whilst the moulding process is in progress. For example, off set cams or rams may be used. Alternatively, a wedge system may provide the force to fix the components of the mould in position.

Plastics are injected into the injection mould aperture 603. The plastic passes through the annular cavity to form the link element 101. A predetermined amount of time is allowed to pass for the plastics to sufficiently cool down. The components of the mould are then separated, as described above, to release the newly formed link element 101. As an alternative, a hot runner/tips arrangement may be implemented to enable the link elements to be moulded.

This step may be repeated any number of times to attach a new link element to the mesh. Alternatively, a linear length of 4 into 1 chains may be created.

Figure 8A:
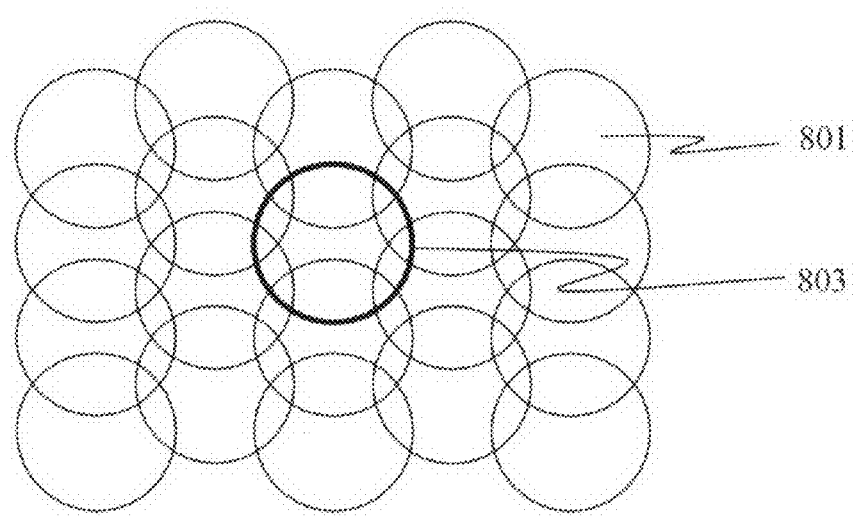
FIG. 8A shows a mesh arrangement with a damaged link that is replaced according to an embodiment of the present invention.

Referring to FIG. 8A, it can be seen that a damaged link 803 within a mesh 801 may be replaced using apparatus similar to the apparatus described above. That is, further apertures may be provided on the top surface of the lower rear block to accommodate the previously formed linkages. Further, the mould insert may be adapted such that it is small enough to be placed between the previously formed link elements in the corresponding position. This modified apparatus works in a stapler like manner wherein the apparatus is adapted to mould link elements within an existing mesh.

The damaged link 803 is removed from the mesh 801 and the four links that were connected to the damaged link 803 are placed within the link accommodating apertures. The mould is closed and the new link is moulded. It will be understood that for the mould to be able to form the new link element through the existing link elements, space will be provided for the existing link elements to be gathered up or moved out of the way to ensure that binding does not occur during the mould process.

Figure 8B:
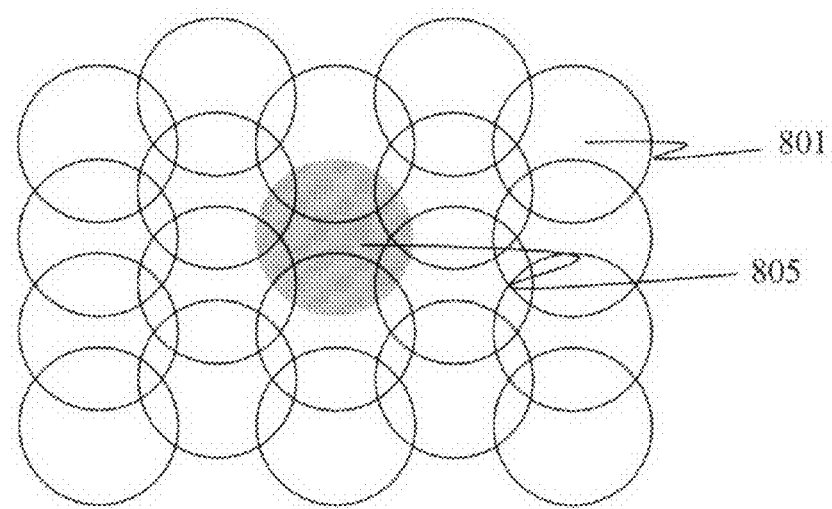
FIG. 8B shows a mesh arrangement with a missing link that is replaced according to an embodiment of the present invention.

Referring to FIG. 8B, it can be seen that a missing link, as represented by the shading 805, may be replaced within the mesh 801 in the same manner as that described above.

Using modified apparatus with additional accommodating apertures for the existing mesh, and a suitably adapted mould insert, two pieces of mesh can be attached together by forming a new link element through existing link elements forming the two pieces of mesh.

Figure 9A:
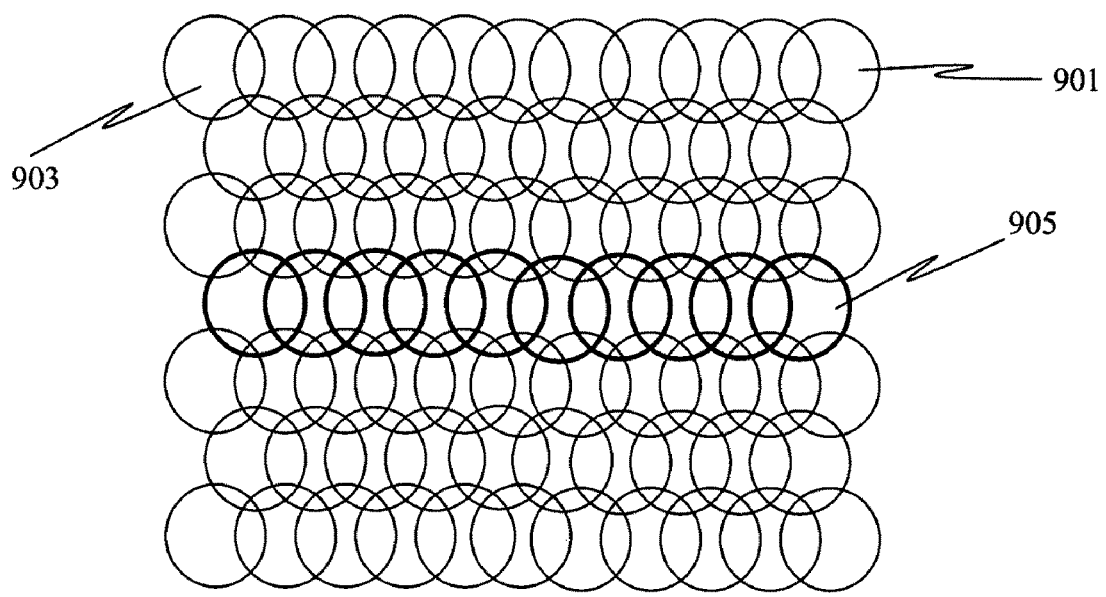
FIG. 9A shows two pieces of mesh connected together using one method according to an embodiment of the present invention.

Referring to FIG. 9A, a first piece of mesh 901 and a second piece of mesh 903 are provided. Two link elements forming a portion of the first piece of mesh 901, and two link elements forming a portion of the second piece of mesh 903 are placed into the pre-formed link accommodating apertures. The mould sections are closed together and the new link element 905 is moulded to connect the two pieces of mesh together. Further new link elements may be moulded to join the two pieces of mesh together along one edge. Once the new link elements are moulded, the result is a new larger piece of mesh where the join can not be seen. Alternatively, two separate edges on one piece of mesh may be joined together whereby the piece of mesh is wrapped around on itself, or wrapped around a separate component. It will be understood that a new link element could be moulded through only one pre-formed link element in each piece of mesh.

Figure 9B:
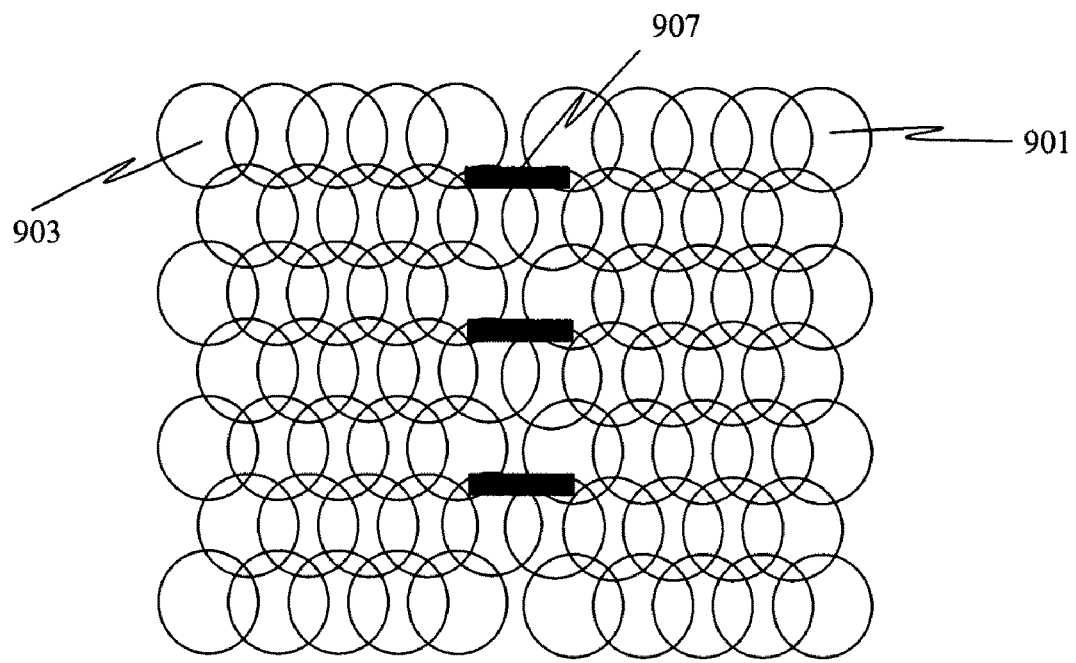
FIG. 9B shows two pieces of mesh connected together using a further method according to an embodiment of the present invention.

Referring to FIG. 9B, the orientation of the new link element may be positioned differently to that described above in relation to FIG. 9A. For example, the new link element may be rotated by ninety degrees thus providing a visual join between the two pieces of mesh.

Figure 10:
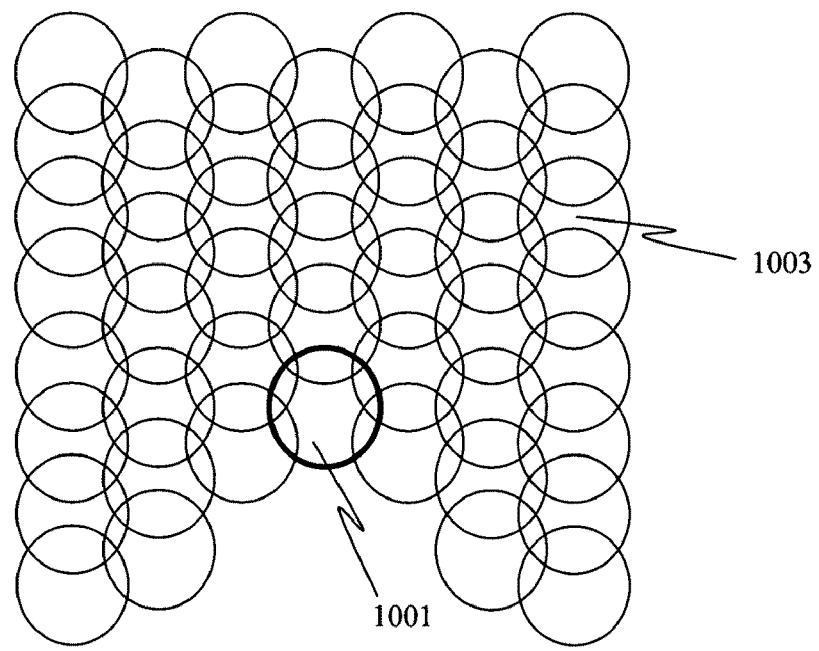
FIG. 10 shows a split mesh incorporating a new link element according to an embodiment of the present invention.

Referring to FIG. 10, a new link element 1001 is shown that is moulded to a mesh 1003 that has a split. In this manner, extra support and strength is provided by the new link element 1001 where the mesh 1003 splits.

Figure 11:
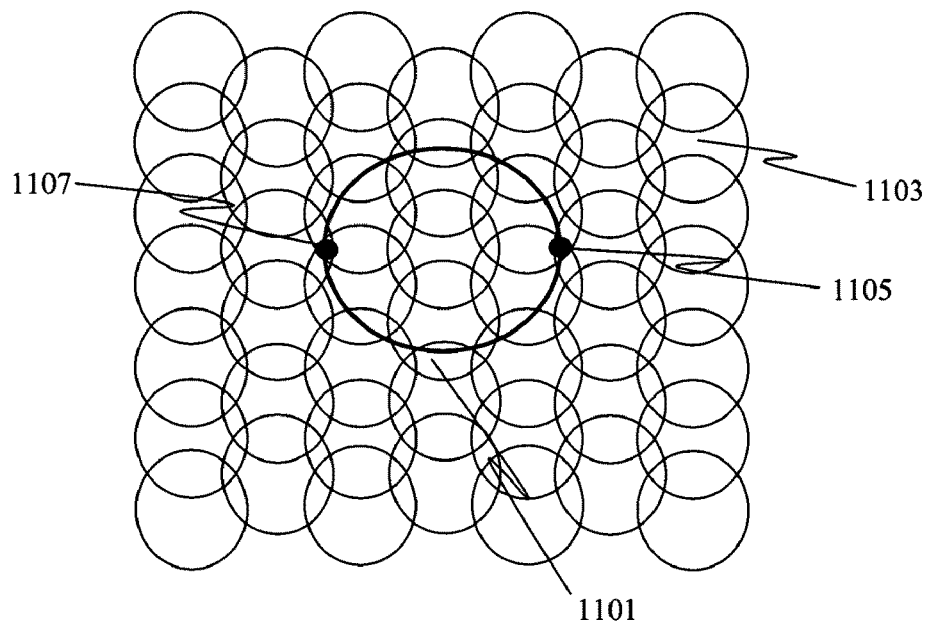
FIG. 11 shows a new link element attached to a mesh according to an embodiment of the present invention.

Referring to FIG. 11, the above-described apparatus may be adapted to mould a new link element 1101 that is larger than the previously formed link elements forming the mesh 1103. The components of the mould, including the upper block, lower front block, rear front block and mould insert may be adapted such when the components are brought together an annular cavity is formed that is of a different size to the pre-formed link elements located in the first, second, third and fourth apertures. Using the adapted mould components a larger link element 1101, for example, can be formed within the pre-formed mesh 1103 to add extra support or strength. In this embodiment, the new link element 1101 is moulded through two apertures (1105, 1107) that are each formed by three overlapping existing link elements. It will be understood that the new link element could also be moulded through apertures formed from a single link element or two overlapping link elements. In order for the new link element to be moulded, the existing link elements are required to be gathered up to allow sufficient space for the moulding apparatus to mould the new link.

Figure 12:
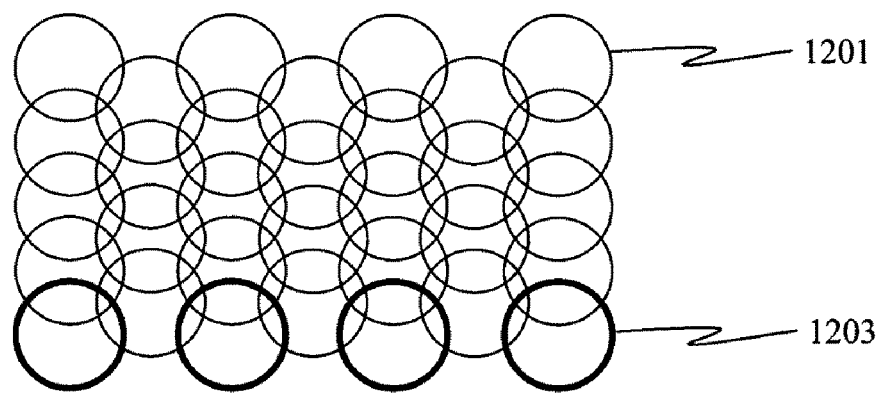
FIG. 12 shows the orientation of a sheet of mesh being controlled according to an embodiment of the present invention.

Referring to FIG. 12 apparatus described above is used to mould one or more weighted link elements 1203 to orientate a sheet of mesh 1201. That is, the weighted link elements 1203 are of a similar size to the link elements forming the mesh 1201, but are formed from a relatively heavier material than that of the material used to form the existing link elements within the mesh 1201. The link elements 1203 are moulded on the sheet of mesh along one edge, or in one area, to provide additional weight in one specific area of the mesh 1201. This causes the mesh to position itself in a particular orientation to the gravitational pull of the heavier link elements 1203. This improves the positioning capabilities of mesh whilst it is hanging up against a surface. It will be understood that, as an alternative, the link elements could be moulded to a separate weighting element as opposed to making specific links a heavier weight than other links.

Figure 13:
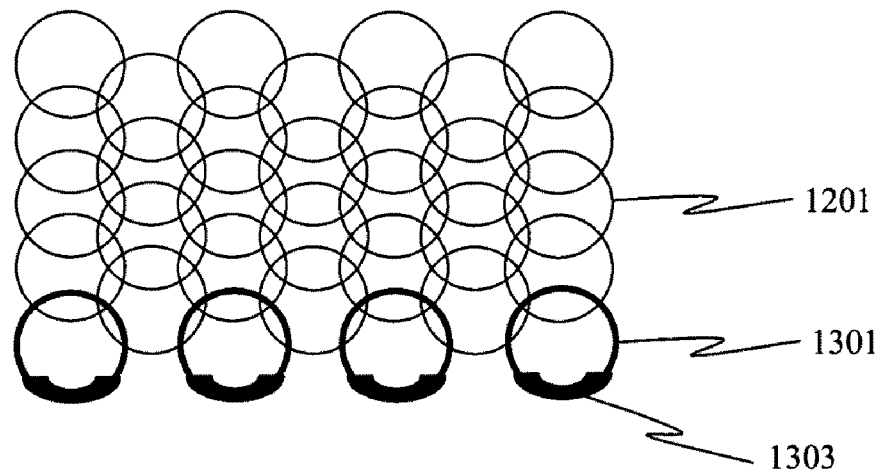
FIG. 13 shows the orientation of a sheet of mesh being controlled according to an embodiment of the present invention.

Referring to FIG. 13, apparatus described above is used to adapt the mesh 1201 by moulding a new link element 1301 to the mesh 1201 wherein the new link element 1301 has a weighted portion 1303 formed therein. The weighted portion 1303 may be integrally formed during the moulding of the new link element 1301 by including the weighted portion 1303 within the mould cavity that is enveloped by the plastic during the moulding step. Alternatively, the weighted portion 1303 may be attached by any suitable means to the newly moulded link element 1301 after moulding.

The apparatus described above can also be used to adapt a sheet of mesh by moulding a new link element into the mesh, wherein the new link element includes a sensor that is integrally provided within the moulded link element. The sensor may be integrally formed during the moulding of the new link element by including the sensor within the mould cavity that is enveloped by the plastic during the moulding step. Alternatively, the sensor may be attached by any suitable means to the newly moulded link element after moulding. The sensor can then be detected by any suitable detection means. Alternatively, the sensor may be a mechanical, electrical, electronic, optical, chemical or magnetic sensor that is adapted to provide readings based on any suitable stimuli. For example, the sensor could be used to detect movement of the mesh, stress and strain on the mesh, temperature changes, etc. The movement of the mesh may be used in motion capture techniques to enable monitoring of surfaces, objects, people etc.

New link elements may be added to an existing mesh, either by replacing existing link elements or by including the link elements in positions where previously formed links already exist, such that the new link elements are a different type to those link elements previously formed in the mesh. For example, the new link elements may be of a different material or of a different visual appearance to the existing link elements. A different material may provide different optical characteristics or could be a different colour or texture to the existing link elements. Further, the different material may be more pliable or more fragile than the existing link elements to allow, for example, interconnected mesh to be stretched or easily separated.

Further, the new link elements may provide optical characteristics that enable optical effects to be created. For example, the new link elements may be moulded from a fluorescent or photochromatic material, or from a material that includes optical elements. The optical elements may be provided by texturing the external surface of the new link elements to provide, for example, light reflection or refraction. Alternatively, the new link elements may include internal optical elements integrally provided within the formed link elements. For example, the internal optical element may be a retro-reflective micro-cube that provides multiple light reflections to provide the optical effect.

Figure 14:
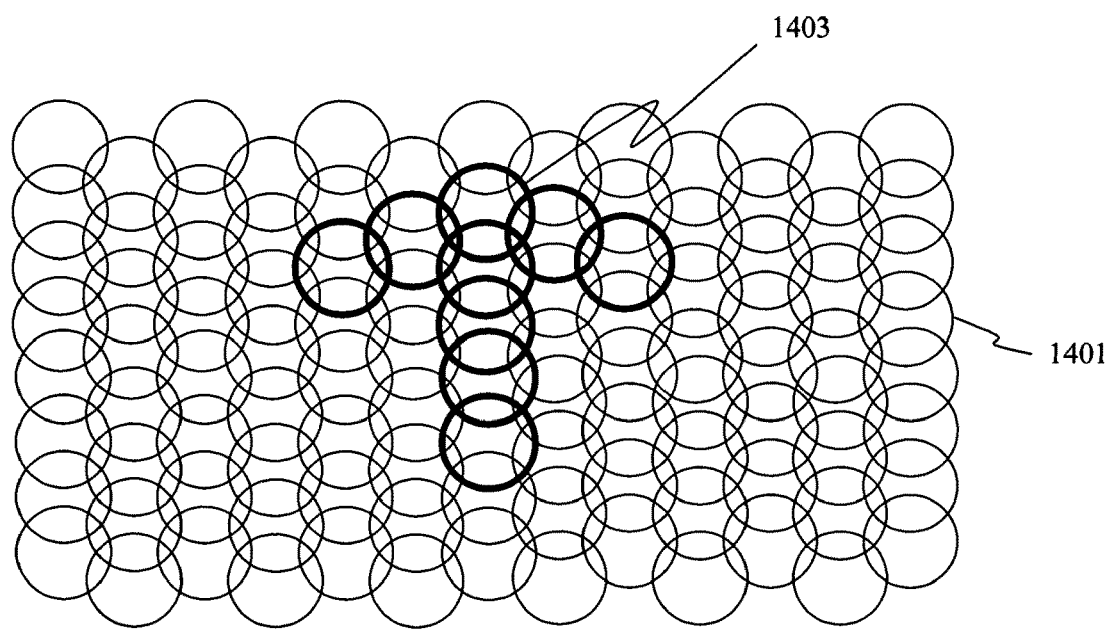
FIG. 14 shows a visual indication on a sheet of mesh according to an embodiment of the present invention.

FIG. 14 shows how added links 1403 can provide a visual indication on a sheet of mesh 1401. In this example, the new link elements are visually different to those link elements previously formed in the mesh. By adding the new links in various pre-determined positions within the mesh, a pattern is formed that allows signs and signals to be produced. For example, the mesh may be used as a decorative wall hanging in a position in a building wherein there is a requirement to show the directions towards a fire exit. Visually different link elements can be moulded into the existing mesh, either by addition or replacement of existing link elements, such that a sign becomes clearly visible, for example, an arrow pointing towards an exit. In a further example, the new link elements formed may be fluorescent, such that the arrow only becomes visible in the dark. This provides a mechanism of directing persons to emergency exits where normal lighting has ceased to work.

Figure 15:
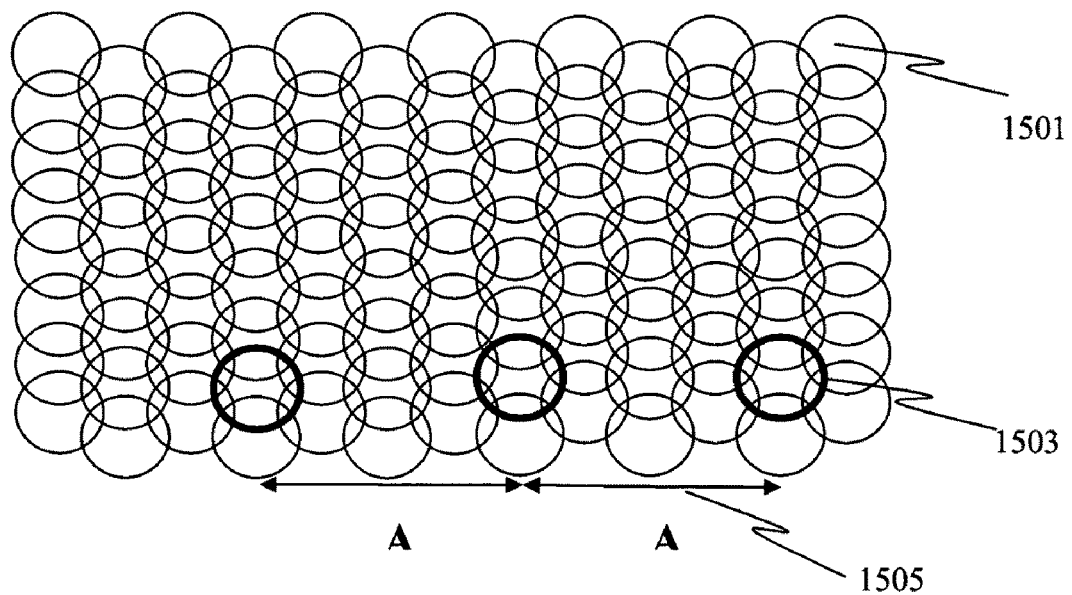
FIG. 15 shows spacing, timing or counting mechanisms using a sheet of mesh according to an embodiment of the present invention.

FIG. 15 shows a sheet of mesh 1501 that has been modified to provide a way of making spatial, timing or counting measurements. The sheet of mesh 1501 includes a number of new link elements 1503 that have been inserted into the mesh at regularly spaced intervals, such as a specific spatial interval A. The new link elements 1503 are of a different type to the existing link elements such that any suitable sensor mechanism can detect and measure movement. For example, by using visually different link elements 1503, an appropriate sensor can detect the movement of the sheet of mesh and so provide a spatial, timing or counting measurement.

Figure 16:
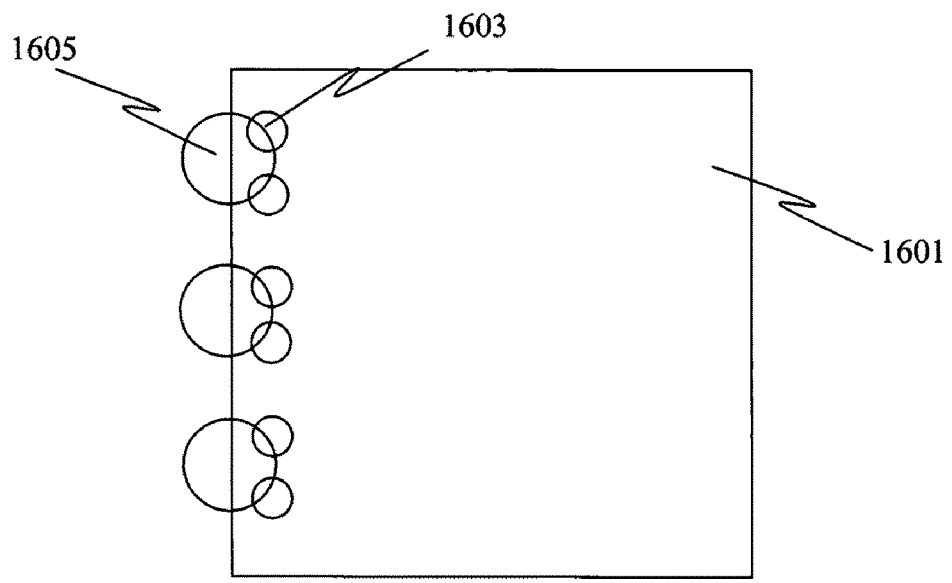
FIG. 16 shows a component with a new link element formed thereon according to an embodiment of the present invention.

The apparatus described above allows a new link element to be moulded to a component having a plurality of linkage points. Referring to FIG. 16, a component 1601, such as a piece of fabric, has a series of double linkage points 1603 where continuous link elements 1605 are moulded in order to attach the link elements 1605 to the component 1601. At least two of the linkage points are placed within specifically adapted first, second, third or fourth apertures formed in the lower rear block and lower front block. The first, second, third or fourth pre-formed link accommodating apertures are adapted such that they can accommodate the linkage points and still provide the annular cavity when the moulds are brought together. The link element 1605 is then moulded as a continuous loop so that it is interconnected through the linkage points 1603 of the component 1601. Any type of component could be used as long as the component has at least two linkage points that can receive the moulded link element. For example, the component may be a piece of fabric that has two apertures located towards one edge of the fabric. The link may then be moulded through the two apertures to provide a mechanism to attach the fabric to an attachment point, such as a curtain railing, using the link element. Alternatively, a fabric with a fold in the centre and a series of linkage apertures may be used to create a permanent folding point.

The apparatus described above is adapted to provide sufficient space around its periphery to allow pre-formed mesh and other components to be brought into close proximity with the annular cavity during the moulding of the new link element. For example, one or more pieces of pre-formed mesh may be gathered up and placed around the edge of the apparatus either to mould a new link element within the existing mesh or to join pieces of mesh together.

The space around the periphery of the moulding apparatus also allows any type of component to be brought into close proximity of the annular cavity of the mould during the moulding process so that the link element can be moulded directly through apertures formed on the components.

An example of the moulding apparatus described above operates in a stapler like manner, wherein the apparatus can be placed and rotated into any suitable position for moulding the new link element onto a mesh or through an aperture on a component at the correct point.

The new link element is connected to the linkage point such that it is free to move. That is, there are no joins because the link element is not fused or adhered to the linkage point.

Further Embodiments

It will be understood that the embodiments of the present invention described herein are by way of example only, and that various changes and modifications may be made without departing from the scope of invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of adding a new link element to a mesh including the steps of:
    providing a first plurality of formed link elements forming a first mesh;
    providing a second plurality of formed link elements forming a second mesh; and
    adding a new link element by molding the new link element through at least one of the formed link elements of the first mesh and at least one of the formed link elements of the second mesh.

2. The method according to claim 1, wherein the new link element is of a different type to the formed link elements.

3. The method according to claim 2, wherein the different type link element is of a different material to the formed link elements.

4. The method according to claim 2, wherein the different type link element is of a different visual appearance to the formed link elements.

5. The method according to claim 4, wherein the new link element includes external optical elements.

6. The method according to claim 4, wherein the new link element includes internal optical elements.

7. The method according to claim 2, wherein a plurality of different type link elements are added at regularly spaced intervals within the mesh and the different type link elements enable one or more of a spatial, timing or counting measurement.

8. A method of adding a new link element to a mesh including the steps of:
    providing a plurality of formed link elements forming a mesh arranged to provide a split in the mesh; and
    adding a new link element to the mesh by molding a single link element through at least two of the formed link elements that provide the split.

9. The method according to claim 8, wherein the new link element is of a different type to the formed link elements.

10. The method according to claim 9, wherein the different type link element is of a different material to the formed link elements.

11. The method according to claim 9, wherein the different type link element is of a different visual appearance to the formed link elements.

12. The method according to claim 11, wherein the new link element includes external optical elements.

13. The method according to claim 11, wherein the new link element includes internal optical elements.

14. A method of adding a new link element to a mesh including the steps of:
    providing a plurality of formed link elements forming a mesh; and
    adding a new link element to the mesh by molding a single link element through at least one of the formed link elements, wherein the plurality of formed link elements are arranged such that the new link element is added by molding the single link element at a position in the mesh where a formed link element is not yet provided.

15. The method according to claim 14, wherein the single link element is molded to be a different size to the formed link elements.

16. The method according to claim 14, wherein the new link element is added to replace a broken or missing formed link element.

17. The method according to claim 14, wherein the new link element is of a different type to the formed link elements.

18. The method according to claim 17, wherein the different type link element is of a different material to the formed link elements.

19. The method according to claim 18, wherein the different type element enables optical effects to be created when the new link element is added.

20. The method according to claim 19, wherein the new link element includes external optical elements.

21. The method according to claim 19, wherein the new link element includes internal optical elements.

22. A method of adding a new link element to a mesh including the steps of:
    providing a plurality of formed link elements forming a mesh; and
    adding a new link element to the mesh by molding a single link element through at least one of the formed link elements, wherein the new link element is adapted to enable the orientation of the mesh to be controlled.

23. The method according to claim 22, wherein the new link element is of a different type to the formed link elements.

24. The method according to claim 23, wherein the different type link element is of a different material to the formed link elements.

25. The method according to claim 23, wherein the different type link element is of a different visual appearance to the formed link elements.

26. The method according to claim 25, wherein the new link element includes external optical elements.

27. The method according to claim 25, wherein the new link element includes internal optical elements.

28. The method according to claim 22, wherein a weighted portion is integrally provided as part of the new link element during the molding step, and the method further includes the step of:
    controlling the orientation of one of the group consisting of: the mesh; the new link element, through the arrangement of the new link element within the mesh.

29. The method according to claim 22, wherein a sensor portion is integrally provided as part of the new link element during the molding step, the sensor adapted to measure mechanical, electrical, electronic, optical, chemical or magnetic stimuli, and the method further includes the step of:
    controlling the orientation of the mesh based on the measured stimuli.

* * * * *